Dec. 3, 1963  C. D. SNELLING  3,112,878
SELF-CONTAINED TEMPERATURE CONTROL SYSTEM
Filed May 16, 1961  2 Sheets-Sheet 2
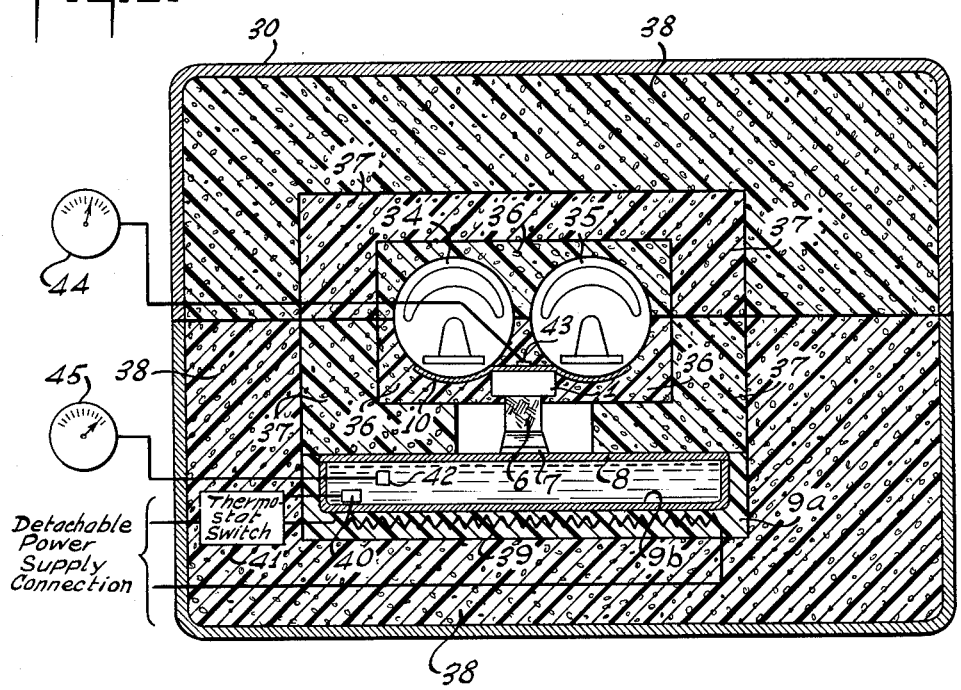
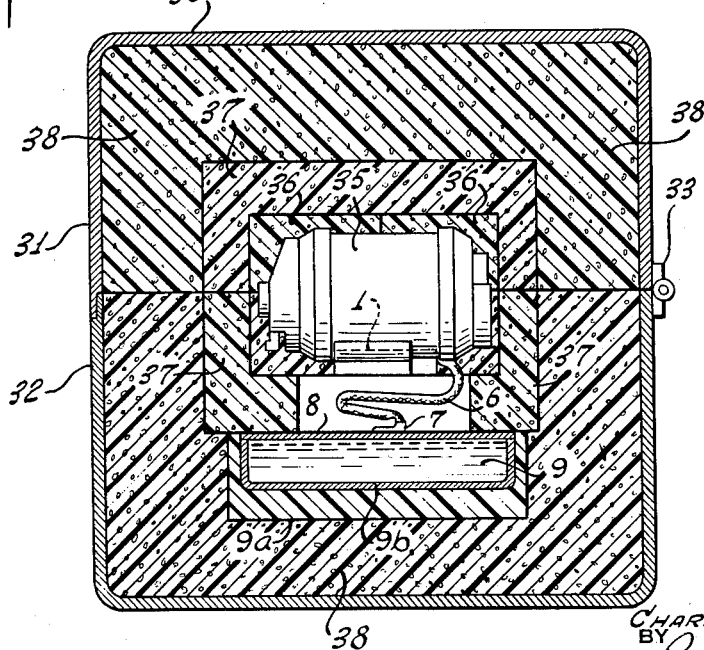
INVENTOR
CHARLES D. SNELLING
BY
ATTORNEY United States Patent Office 3,112,878
Patented Dec. 3, 1963

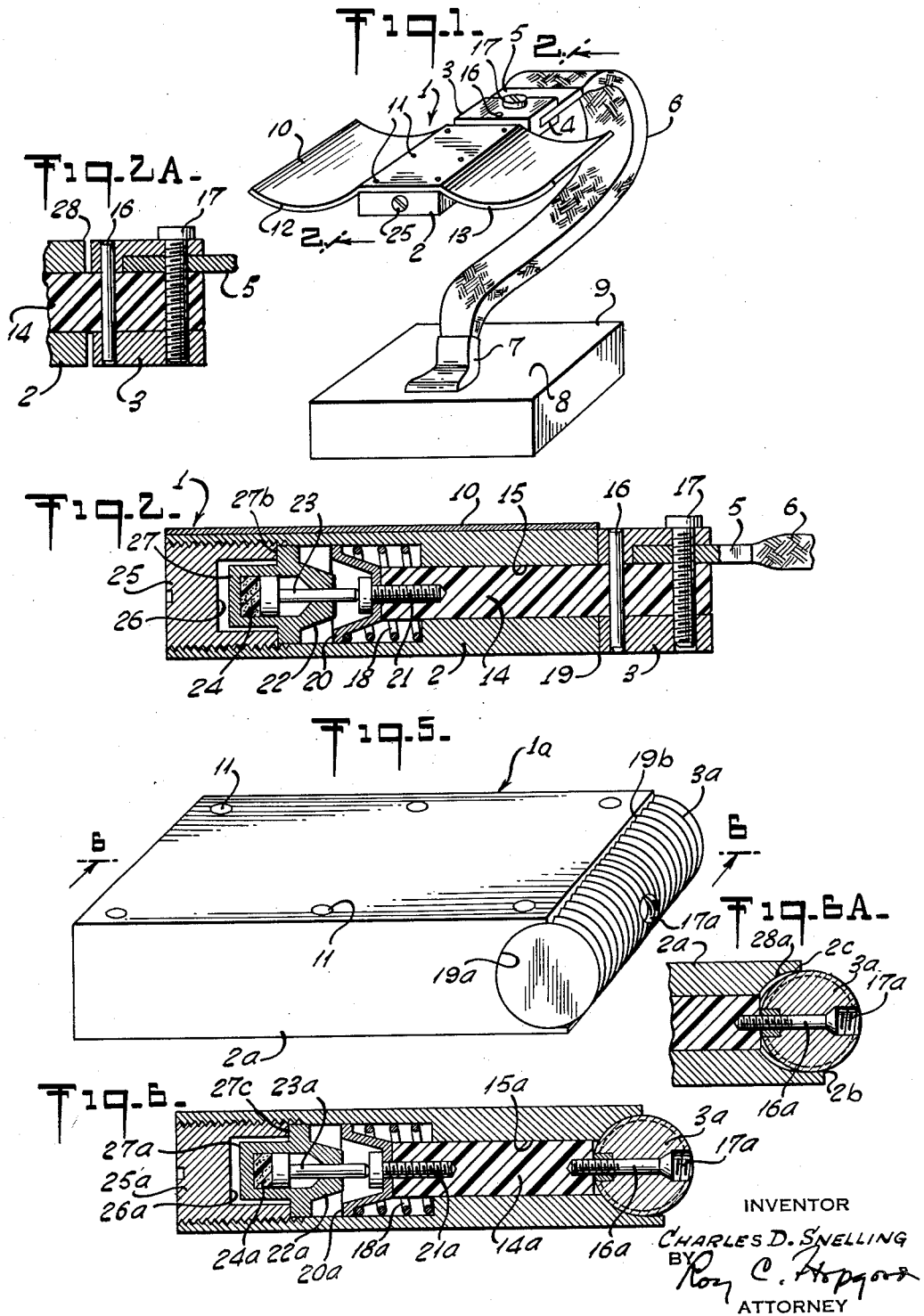

3,112,878
SELF-CONTAINED TEMPERATURE
CONTROL SYSTEM
Charles D. Snelling, Breinigsville, Pa.
Filed May 16, 1961, Ser. No. 110,510
4 Claims. (Cl. 236—1)

This invention invention relates to a self-regulating temperature control system and, in particular, to a method and apparatus for closely regulating over a given period of time the temperature of a temperture-sensitive object subject to the adverse influence of an outside environment characterized by a wide variation in ambient temperatures.

Extremely delicate instruments, such as precision gyroscopes, velocity meters, and the like, are generally adversely affected by variations in ambient temperatures. Where these or similar instruments are employed as an essential part of an instrument package for use in devices subject to the influence of fluctuating ambient temperatures or in devices adapted to obtain scientific information of a particular environment, e.g., environmental probe devices, such instruments are generally standardized to a particular reference temperature. Unless extreme care is taken to maintain the delicate instrument as close as possible to its predetermined reference condition, or care taken to insure compensation for any adverse effect of the ambient environment, the delicate instruments may be rendered ineffectual or the device containing the instruments rendered practically useless for its intended purpose.

Although attempts have been made to protect the instruments or maintain them at their predetermined reference conditions, generally such attempts have led to the introduction of rather complicated temperature control devices. As far as I am aware, no simple apparatus has been proposed capable of providing a self-regulating system within the instrument package itself, particularly a system which will maintain constant conditions for a day or two, or even for at least a week, such as might be required in a short-time environmental probe device.

It is the object of my invention to provide an apparatus for closely regulating the temperature of a temperature sensitive object, such as a precision gyroscope or a velocity meter.

Another object is to provide a dependable temperature regulation unit light weight in its construction and versatile in its application for use in systems subject to a wide range of fluctuating ambient or environmental temperatures, for example, temperatures ranging from about −200° F. to about 150° F.

Still another object is to provide as a preferred embodiment a temperature control system which is self-regulating over a substantial long period of time and which system does not require the external application of energy to maintain its regulating effect during the period of regulation.

A further object is to provide a self-regulating temperature system capable of regulating the temperature of a temperature-sensitive object to within closely held limits, such as within a few degrees, or even within ±0.5° F. for a prolonged period of time, for example, for at least a week.

These and other objects will more clearly appear from the following description and the appended drawings, wherein:

FIG. 1 is illustrative of one combination of elements comprising a heat valve, a flexible heat conductor and a heat sink employed in one embodiment of a self-regulating temperature control system;

FIG. 2 is a cross-section taken along line 2—2 of FIG. 1 showing in more detail the various elements which make up the heat valve employed in the invention;

FIGURE 2A illustrates the heat valve of FIGURE 2 in a reduced heat flow position;

FIGS. 3 and 4 show substantially in cross-section the front and side elevation of an instrument package utilizing the temperature control device of the invention;

FIG. 5 is a three-dimensional representation of another embodiment of a heat valve;

FIG. 6 is a cross-section taken along line 6—6 of FIG. 5 showing in more detail the various elements which make up this embodiment of the block; and FIG. 6A illustrates the heat valve of FIGURE 6 in a reduced heat flow position.

According to my invention, I can produce a self-regulating system which will work over a prolonged period of time by employing a method comprising insulating the object to be protected from the ambient environment under substantially adiabatic conditions, providing a heat energy storage device or heat sink also similarly insulated from said environment and said object, providing a connectable path of heat flow between said object and said heat sink, producing a sensing signal corresponding to the temperature within the immediate environment of the object, connecting said path of heat flow between said object and said heat sink and varying the amount of heat flow along said path between said object and said heat sink in accordance with the sensing signal to maintain the temperature of the object at its predetermined level. In this way, I add just enough heat to make up for the slight loss through the insulation.

I have found that by utilizing a system under substantially adiabatic conditions, that in a system in which the heat loss to or heat gain from the ambient environment is kept to a minimum, I am able to provide a very simple self-regulating system capable of operating for a prolonged period of time without the external application or removal of heat energy during the regulating period, be it a day, several days, or for at least a week. By substantially adiabatic conditions, I have in mind heat energy systems in which, at worst, the rate of temperature drop of the temperature-sensitive object is maintained by means of insulation below one-half degree F. per minute and preferably below one-quarter degree F. per minute over ambient temperatures fluctuating within the somewhat extreme range of about −200° F. to 150° F. Generally speaking, under the conditions in which my system normally works, the adiabatic condition is such that the temperature drop or gain does not exceed more than 1 or 2° F. per hour. Under such conditions, I am able to maintain the temperature constant for an extended period of time.

I find by preferably working under the foregoing conditions and by using a flexibly arranged heat conductive metal as the heat transfer medium from the heat sink to the object that very sensitive temperature regulation may be effected, for example, within plus or minus 0.5° F. In its broad aspects, the apparatus (note FIGS. 1, 3 and 4) employed in carrying out the invention comprises a heat sink spacially related to and at a temperature different from that of the object to be regulated (by heat sink I mean a heat energy storage device capable of adding or extracting heat from an object in order to maintain its temperature constant), means for insulating the object and said heat sink from each other and from the ambient temperature under substantially adiabatic conditions, heat conductive means adapted to be coupled to said heat sensitive object or to heat conductive means associated with said object, means for coupling said heat conductive means to effect heat flow therethrough and temperature-sensing means associated with the environment of said object for actuating said coupling means.

As illustrative of the essential elements which in combination point up the broad aspects of the invention reference is made to FIG. 1 which shows a thermostatically controllable metal block or heat valve designated generally by the numeral 1 (note also FIG. 2) comprising a forward block or first portion 2, preferably of aluminum, and a rearward or second block portion 3, preferably of copper. The second block portion 3 is connected to said first portion via a heat insulative means (to be described later) slidably associated with the interior of the first block portion whereby said second block portion is adapted to be in contactable and heat conductable relationship with said first portion. The second block portion has a slot adapted to receive a heat conductive bus element portion 5, e.g., copper, connected to a plurality of strands of woven copper wire 6 which in turn are connected to another heat conductive bus element 7 connected by soldering or other means in heat conductive relationship with heat conductive surface 8 of heat sink 9. Thus, heat will flow from heat sink 9 through bus element 7, through the strands of copper or other heat conductive metal 6 to heat conductive bus element 5 and then to the second block portion 3. If block portion 3 is in heat conductive contact with block portion 2, then heat will flow into portion 2.

In use, metal block 1 would be in close association with the sensitive object whose temperature is to be controlled. In one embodiment the close association may be achieved by means of a heat conductive support 10, such as a copper plate, joined in intimate heat conductive relationship with the metal block 1 via screws 11 or other fastening means, the copper plate being configured in this instance with a pair of slightly cylindrical curved wings 12 and 13 adapted to hold two cylindrically shaped temperature-sensitive objects, for example, two gyroscopes (note FIG. 3). By using a flexible heat conductive means, such as strands of copper wire 6, I am enabled to pack the elements making up the device substantially completely within a resilient insulation material, such as urethane plastic foam (note FIGS. 3 and 4). Since the elements are not connected into a rigid structure and since the wire is flexible, the delicate temperature-sensitive object can be cushioned to resist extraneous mechanical vibration. The thickness of insulation surrounding the elements of the device should be at least sufficient to insure substantially adiabatic conditions.

In the embodiment shown in FIG. 1, the heat valve or metal block 1 together with the heat conductive support 10 is thermostatically controllable to a particular reference temperature by temperature-control means associated with the valve. This will be clearly apparent by referring to FIG. 2 which is a cross-section taken along line 2—2 of FIG. 1. The valve is shown comprising first block portion 2 having associated in contactable and heat conductive relationship therewith second block portion 3 connected to said first block portion via heat insulative rod 14 of fiber-reinforced phenolic resin, or other suitable heat insulative material, which is slidably mounted within cylindrical bore 15 of the block portion 2 but integral with block portion 3 by means of pin 16 as well as set screw 17 which is also adapted to fasten heat conductive bus element 5. Rod 14 has associated with it biasing spring 18 which together with other associated elements is adapted to maintain block portion 2 in heat conductive relationship with block portion 3 along parting line 19. The contacting faces of each portion must be precision machined and polished flat and be free from tool marks to insure good surface contact.

Biasing spring 18 is held in position by flanged cupped retainer 20, which retainer is connected to the end portion of rod 14 via screw 21. The tendency for the spring is to expand and maintain the two block portions in heat conductive contact at parting line 19.

Against the well of retainer 20 is disposed one end of a thermostatic element 22 having a piston and rod combination 23 adapted to be pressed up against the head of screw 21 in the well of retainer 20. The cylinder behind the piston head of piston and rod 23 contains a thermally sensitive wax composition 24 adapted to undergo change in volume with changes in temperature. To keep the contained elements in cooperable relationship, a threaded plug 25 is provided at one end of block portion 2. The plug has a blind hole 26 for receiving head 27 of thermostatic element 22. The plug is designed so that it presses against flange 27b of thermostatic element 22, with rod 23 in turn pressing against screw 21 in the well of retainer 20. The amount of pressure applied by the turn of the plug will depend upon the particular setting required for a particular reference temperature.

Assuming that heat valve 1 has been set so that the block portion 2 is in heat conductive relationship with block portion 3 along contact line 19, and that the temperature of the sensitive object resting on heat conductive support 10 has exceeded its standard reference temperature and that the temperature of the parts of block 2 is in equilibrium with the sensitive object, wax 24 will expand, push piston rod 23 against rod 14 in opposition to biasing spring 18, thereby causing block portion 3 to separate from block portion 2, leaving a non-conductive space 28 as shown in FIG. 2A. The block will be rendered substantially nonheat conductive until the temperature of the sensitive object and its support 10 drops to below its standard reference temperature, whereby wax composition 24 contracts and biasing spring 18 returns rod 14 to its home position to bring the two blocks in heat conductive relationship.

An instrument package produced from the embodiment shown in FIG. 1 is illustrated in FIGS. 3 and 4. The figures show in cross-section, except for the temperature sensitive objects which are not sectioned, the various elements making up the package comprising outer casing 30 of metal, wood, plastic, or the like formed of two halves 31 and 32 hinged at 33 and showing packed within it heat conductive block 1 of FIGS. 1 and 2 supported by resilient urethane foam plastic. Connected to the block is heat conductive support 10 in heat conductive relationship with a pair of gyroscopes 34 and 35 which are snugly packed in and surrounded by urethane foam segments 36. These segments are further surrounded by urethane foam segments 37 which in turn are surrounded and supported by additional urethane foam 38. Thus, a vibration resistant package is provided as well as one which is substantially adiabatically insulated from the ambient environment.

Flexible strands of copper wire 6 extend from block 1 and are connected to heat conductive surface 8 of heat sink 9 via heat conductive bus element 7 of copper. Heat sink 9 is specially associated with the sensitive objects but sufficiently insulated therefrom to maintain substantially adiabatic conditions. The heat sink is preferably formed as a thermos vessel with an outer wall 9a of insulating material and an inner wall 9b of heat conductive metal to insure flow of heat to heat conductive surface 8 of the heat sink. The heat source is preferably a molten bath having a relatively high heat of solidification. Examples of such salts will be disclosed hereinafter.

Another embodiment of a heat valve is illustrated in FIGS. 5, 6 and 6A. In FIG. 5 a three-dimensional representation of the heat valve is shown designated generally by the numeral 1a comprising a first block portion 2a having associated in heat conductive relationship with it a cylindrically configured second block portion 3a. The cylindrical surface of block portion 3a is threaded and is adapted to be in threading engagement with cylindrically conforming surface 19a of the first block portion which has threads 19b of the same pitch as shown in FIG. 5.

The construction details of heat valve 1a will be more clearly apparent by referring to FIG. 6 which is a cross-section taken along line 6—6 of FIG. 5. Cylindrical block portion 3a, preferably of copper, is connected to block portion 2a, which may be of aluminum, via heat insulative rod 14a, the rod being formed of fiber-reinforced phenolic resin, or other suitable heat insulative material. The rod is slidably mounted within cylindrical bore 15a of block portion 2a but integral with cylindrical block portion 3a by means of screw 16a. A threaded opening 17a is provided in block portion 3a adapted to receive a threaded heat conductive bus element (not shown) connected to a plurality of strands of copper wire (not shown) as in FIG. 2. Also as in FIG. 2, rod 14a has associated with it biasing spring 18a which together with other associated elements is adapted to maintain block portion 2a in heat conductive relationship with block portion 3a along parting surface 19a. The contacting surface defined by the threads must be precision made to insure optimum heat conductivity.

Biasing spring 18a is held in position by flanged cupped retainer 20a, which retainer is connected to the end portion of rod 14a by screw 21a. As stated hereinbefore, the tendency for the spring is to expand and maintain the two block portions in heat conductive contact as surface 19a.

The remaining elements are substantially the same as those shown in FIG. 2 and comprise retainer 20a against which is disposed a thermostatic element 22a having a piston and rod combination 23a adapted to be pressed up against the head of screw 21a in the well of retainer 20a. A thermally sensitive wax 24a is provided within head 27a for the purpose described for FIG. 2. Similarly, a threaded plug 25a is also provided having a blind hole 26a for receiving head 27a of thermostatic element 22a, the plug being set to press against flange 27c of element 22a with rod 23a in turn passing against screw 21a in the well of retainer 20a. As described for the previous embodiment, the amount of pressure applied by the turn of the plug will depend upon the particular setting required for a particular reference temperature. When the temperature of the object exceeds its reference temperature, thermostatic element 22a will cause rod 14a to slide forward and separate block portion 3a from block portion 2a, leaving a non-conductive space 28a as shown in FIG. 6A while still maintaining some conductive contact at, for example, lip 2b which is designed to extend further out than lip portion 2c substantially diametrically above it. Thus, with this embodiment, I am enabled to either gradually decrease the amount of heat conducted from block portion 3a to portion 2a or cut it off altogether when block portion 3a moves sufficiently until it finally breaks contact at the last point of contact 2b. Conversely, where the temperature of the object drops below its reference temperature, block portion 3a will gradually move towards portion 2a, making first contact at 2b to start heat conduction into the block for further conduction to the heat conductive supports holding the sensitive object.

In setting up the system to maintain a constant temperature of about 70° F. for the temperature-sensitive object, I may provide a heat sink with a temperature higher than that of the object, for example about 100° F., especially related to the object as shown in FIGS. 3 and 4. The system would be insulated with material of low heat conductivity, preferably a urethane plastic foam having a density in the neighborhood of about 2 lb./cu.ft. I find that for my purposes and under the conditions my system is generally adapted to operate that the object as well as the heat source may be insulated from the ambient environment by an insulation thickness of about 2 to 8 inches or greater in providing a substantially adiabatic condition.

Assuming that the temperature-sensing device is set to detect a temperature drop of 0.5° F. and greater and the temperature has dropped, let us say, 3° to 67° F., the volume of wax pellet 24 decreases (refer to FIG. 2), thus taking pressure off piston rod 23, whereby biasing spring 18 causes heat insulative rod 14 to retract along bore 15 and to bring block portion 3 in heat conductive contact with block portion 2 at 19. Heat then flows into block portion 2 and is in turn conducted through heat conductive support 10 to the sensitive object in contact with the support until the block and the object equilibrates at a temperature of 70° F. As the temperature reaches and slightly exceeds 70° F., wax pellet 24 expands sufficiently to exert pressure on piston rod 23 which in turn opposes the biasing action of spring 18, pushes rod 14 forward to separate block portion 3 from block portion 2 and stop the flow of heat from the heat sink via the copper wires to block portion 2. When the temperature of the object again drops to below 70° F., the control cycle is repeated.

In providing a system which will operate for a prolonged period of time, I prefer a built-in heat source in which the heat available to do the desired work is derived from the heat of fusion of a molten compound or derived from the heat of solution of a chemical compound, such as the heat of solution in water.

Examples of substances which may be used in the fused state as a heat source are naphthalene ($C_{10}H_8$), cyanamide ($H_2NCN$), succinic anhydride [$(CH_2CO)_2O$], hydrated sodium chromate ($Na_2CrO_4 \cdot 10H_2O$), hydrated sodium dibasic phosphate ($Na_2HPO_4 \cdot 12H_2O$) and magnesium nitrate ($Mg(NO_3)_2$). Another substance is one known commercially as Transit Heet 150 comprising trisodium phosphate and water.

Naphthalene which melts at about 184° F. exhibits a heat of fusion of about 64 B.t.u./lb. Cyanamide melts at about 109.4° F. and has a heat of fusion of about 89 B.t.u./lb. Sodium chromate melts at about 73.4° F. and exhibits a heat of fusion of about 70 B.t.u./lb. Sodium dibasic phosphate melts at about 96.8° F. and on solidifying gives off about 120 B.t.u./lb. of salt. Transit Heet 150 melts between 150 to 155° F.

Where a substance with a particular melting temperature is desired to suit a particular system, low melting eutectic mixtures may be employed. Details as to such mixtures need not be gone into here, such information being readily available in the literature.

As stated above, the heat source may also be based on heats of solution. The solution of sodium oxide ($Na_2O$) in water would be one example. The solution of 1 mole of $Na_2O$ in 99 moles of water will yield about 56.39 kg. calories which corresponds to about 224 B.t.u.'s Or the heat of solution may be derived from the solution of 1 mole of $AlCl_3$ in water to obtain upwards of 77.9 kg. calories, corresponding to 309 B.t.u.'s. Or the heat source may be one based on heat of crystallization, such as might be obtained from a super-cooled solution of sodium acetate in water.

Assuming a system in which the sensitive instrument and its container weighs about 5 lbs. (with average specific heat of about 0.1) and is to be maintained at a temperature of about 70° F. in an ambient environment of about 20° F., I would employ a heat reservoir designed as a thermos vessel (note FIGS. 3 and 4) containing about 10 lbs. of molten cyanamide at a temperature of about 120° F. Assuming in addition that the system is substantially adiabatically insulated from the ambient temperature so that at the outside the object may drop in temperature at the rate of about 0.03° F./minute, the extent to which the system may be self-regulating can be readily estimated.

The amount of heat given up by the object each minute would come to about 0.015 B.t.u. (mass × sp. H. × temp. drop). Ten pounds of cyanamide are capable of giving off 10 × 89 or 890 B.t.u.'s on solidification. Ignoring the fact that the molten cyanamide also has additional source of heat by virtue of its temperature being higher than that of the object, the latent heat of fusion itself would supply enough heat, assuming 100 percent efficiency of heat utilization, to maintain the temperature of the object substantially constant for a prolonged period of time. Dividing 890 by 0.015, the heat given off through solidification would theoretically be sufficient to control the temperature for almost 60,000 minutes or 1000 hours. Assuming only 20% heat transfer efficiency, the heat derived by solidification alone would be at least sufficient to control the object temperature for 200 hours or for over a week. It is apparent from the foregoing that highly versatile self-contained control systems are possible by my invention.

In certain instances, a situation may arise wherein the heat in the heat storage device spends itself before or even after the device has been put into use. Therefore, as a preferred embodiment, I may provide a thermostatically controlled heat charging means of, for example, the type shown schematically in FIG. 3 comprising an electric heating element 39 in heat conductive relationship with heat sink 9, the heating element being connected to a detachable power supply source outside the package. A thermostat-sensing element 40 would be provided in the heat storage region 9 in cooperative relationship with thermostat 41 for actuating said heating elements when the temperature of the heat storage device drops below a particular value. Additional thermostat-sensing elements 42 and 43 may also be provided in heat storage device 9 and in heated region near block 1, respectively, so that the instantaneous condition of the vital parts of the container may be continuously monitored on dials 44 and 45 on one of the outside faces of the instrument package. For example, assuming that the salt contained in heat sink 9 is one known commercially as Transit Heet 150 (trisodium phosphate and water) and that it has solidified, thermostat 41 would be set so that sufficient heat would be added to heat storage device 4 to melt the salt, which melts between 150 and 155° F., and cut off when the temperature of the salt has reached the neighborhood of about 165° F. to 180° F. Of course, it will be appreciated that numerous and multiple ways may be provided for applying heat to the heat storage device. For example, an hermetically sealed unit may be employed comprising an arrangement of tubing conducting hot water or steam vapor heated by a built-in calrod unit detachably connectable to an outside power source.

The insulation which may be employed in maintaining the system as close to adiabatic as possible may be one whose heat conductivity in British units ranges up to about 0.5 B.t.u./hr./sq. ft./° F./in. or from 0.2 to 0.5. As has been stated, I prefer to use urethane plastic foam which comes in various densities ranging from about 1 to 20 lbs. per cubic foot, e.g., 2 lbs./cu. ft., with heat conductivities varying with density up to about 0.3 B.t.u./hr./sq. ft./° F./in. I have found that foams of very low density, e.g., as low as 2 lbs./cu. ft., and of heat conductivities in the neighborhood of about 0.2 to be very useful in carrying out my invention. For my purposes, urethane foam materials are particularly adaptable as they can be foamed in place whereby to provide a vibration-resistant support for the temperature control system. Vinyl foams may also be employed. Certain other insulating materials of rather low heat conductivity may be used, such as cotton wool ($K$=0.136), hair felt ($K$=0.36), mineral wool ($K$=0.27) and the like not to mention cork, Santocel, glass wool, etc.

As has been stated, the metals making up the heat conductive metal block may include such high heat conductive metals as aluminum and copper. I prefer the flexible heat conductor associated with the metal block to be made of copper. Of course, any heat conductive metal may be employed having heat conductivities referred to copper of at least about 0.1, it being understood that the smaller the fraction the less effective the speed of heat transmission will be.

When insulating the temperature-sensitive object, it is desirable that the temperature of the insulation and the heat conductive block initially be very close and preferably equal to that of the object. In this way, I am able to start with a system that is initially adibatic in principle so that the object will not be subject to any rapid falling off in temperature, particularly where the insulation is at least thick enough to inhibit a rapid loss in heat content.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:
1. In a system for controlling the temperature of a temperature-sensitive instrument tending to lose its heat to an environment cooler than said instrument the combination comprising, a temperature-sensitive instrument, means supporting said instrument including heat conductive means contactably associated with said temperature-sensitive instrument, a heat sink spacially related to and at a temperature higher than the temperature of the instrument to be regulated, said heat sink comprising a reservoir containing a chemical heat storage material characterized by a relatively high heat of fusion, insulation surrounding said instrument and said heat sink for insulating them from each other and from said environment under substantially adiabatic conditions, a thermostatically controllable heat conductive metal valve comprising a first metal block portion having movably associated therewith in contactable and heat conductable relationship a second metal block coupled to said first block via a heat insulative rod connected to one of said blocks and slidably mounted within a bore of the other of said blocks, biasing means associated with said rod to maintain said blocks in heat conductive relationship with each other, a temperature-sensing means within said metal valve for opposing the biasing means when a given temperature is exceeded whereby to separate the contactable metal blocks, a flexible metal heat conductor connecting said second block portion in direct heat conductive relationship with said heat sink, and means heat conductively connecting said first block portion to said heat conductive means contactably associated with said temperature-sensitive instrument.

2. An instrument package with self-regulating temperature means controlling the temperature of a temperature-sensitive instrument tending to lose its heat to an environment cooler than said instrument which comprises, a container having insulatedly packed therein a temperature-sensitive instrument and a heat sink spacially related thereto and at a temperature higher than that of the instrument, said heat sink comprising a reservoir containing a chemical heat storage material characterized by a relatively high heat of fusion, heat conductive means contactably associated with said instrument, the insulation in said package being at least effective to resist vibration and being at least sufficient to insulate said object and said heat sink from each other and from said environment under substantially adiabatic conditions, a thermostatically controllable heat conductive metal valve comprising a first metal block portion having movably associated therewith in contactable and heat conductable relationship a second metal block coupled to said first block via a heat insulative rod connected to one of said blocks and slidably mounted within a bore of the other of said blocks, biasing means associated with said rod to maintain said blocks in heat conductive relationship with each other, a temperature-sensing means within said metal valve for opposing the biasing means when a given temperature is exceeded whereby to separate the contactable metal blocks, a flexible metal heat conductor within said package connecting said second block portion in direct heat conductive relationship with said heat sink, and means heat conductively connecting said first block portion to said heat conductive means contactably associated with said temperature-sensitive instrument.

3. A thermostastically controllable heat conductive metal valve comprising a first metal block portion of heat conductive metal having associated in contactable and heat conductable relationship therewith a second heat conductive metal block portion coupled to said first block portion via a heat insulative rod connected to said second block portion and slidably mounted within a bore of said first portion, a biasing spring associated with one end of said slidably mounted heat insulative rod, a retainer means also associated with said end of said rod for maintaining said spring in biasing relation to said rod thereby to maintain said second block portion in heat conductive relationship with said first block portion, a temperature-sensing means within said thermostatically controllable metal valve adapted to exert pressure against said slidably mounted insulative means in opposition to said biasing spring when a given temperature has been exceeded, and means associated with said valve for maintaining said temperature-sensing means in cooperable relation with said slidably mounted rod, whereby when said given temperature is exceeded said second block portion is caused to move in a direction tending to bring it out of heat conductive relationship with said first block portion of said heat conductive metal valve.

4. The thermostatically controllable heat conductive metal valve of claim 3, wherein the heat conductive contact between the two block portions is along a coincident flat face of each of the portions.

References Cited in the file of this patent

UNITED STATES PATENTS

| 1,703,803 | Widstrom | Feb. 26, 1929 |
| 1,882,803 | Giesler | Oct. 18, 1932 |
| 1,893,666 | Gebhard | Jan. 10, 1933 |
| 2,010,180 | Ferranti | Aug. 6, 1935 |
| 2,289,007 | Gessler | July 7, 1942 |
| 2,301,007 | Baldwin | Nov. 3, 1942 |
| 2,368,182 | Vernet | Jan. 30, 1945 |
| 2,620,788 | Rivoche | Dec. 9, 1952 |
| 2,808,494 | Telkes | Oct. 1, 1957 |
| 2,942,051 | Roeder | June 21, 1960 |

FOREIGN PATENTS

| 828,834 | France | Feb. 28, 1938 |